(12) United States Patent
Brands

(10) Patent No.: US 10,437,872 B2
(45) Date of Patent: Oct. 8, 2019

(54) COMPUTER IMPLEMENTED AND COMPUTER CONTROLLED METHOD, COMPUTER PROGRAM PRODUCT AND PLATFORM FOR ARRANGING DATA FOR PROCESSING AND STORAGE AT A DATA STORAGE ENGINE

(71) Applicant: DYNACTIONIZE N.V., Antwerp (BE)

(72) Inventor: Michael Rik Frans Brands, Halle-Zoersel (BE)

(73) Assignee: DYNACTIONIZE N.V., Antwerp (BE)

( * ) Notice: Subject to any disclaimer, the term of this patent is extended or adjusted under 35 U.S.C. 154(b) by 268 days.

(21) Appl. No.: 15/606,914

(22) Filed: May 26, 2017

(65) Prior Publication Data
US 2017/0344634 A1 Nov. 30, 2017

(30) Foreign Application Priority Data
May 27, 2016 (NL) ...................................... 2016846

(51) Int. Cl.
| | |
|---|---|
| *G06F 16/35* | (2019.01) |
| *G06F 16/41* | (2019.01) |
| *G06F 16/28* | (2019.01) |
| *G06F 16/21* | (2019.01) |
| *G06F 16/13* | (2019.01) |
| *H04L 29/08* | (2006.01) |

(52) U.S. Cl.
CPC ............ *G06F 16/353* (2019.01); *G06F 16/21* (2019.01); *G06F 16/288* (2019.01); *G06F 16/41* (2019.01); *G06F 16/134* (2019.01); *G06F 16/35* (2019.01); *H04L 67/30* (2013.01)

(58) Field of Classification Search
CPC ...................................................... G06F 16/288
See application file for complete search history.

(56) References Cited

U.S. PATENT DOCUMENTS

| | | | | |
|---|---|---|---|---|
| 5,909,678 | A * | 6/1999 | Bergman | ............ G06F 16/3322 |
| 2003/0233224 | A1* | 12/2003 | Marchisio | ............. G06F 17/271 |
| | | | | 704/4 |
| 2005/0033725 | A1* | 2/2005 | Potter | .................... G06Q 10/06 |
| 2007/0106767 | A1 | 5/2007 | Yamamoto et al. | |

(Continued)

FOREIGN PATENT DOCUMENTS

GB   2411256 A   8/2005

*Primary Examiner* — William Spieler
(74) *Attorney, Agent, or Firm* — Steinfl + Bruno, LLP

(57) ABSTRACT

A computer implemented and computer controlled method of arranging data for processing and storage thereof at a data storage engine. To identified data elements, an action is assigned from a plurality of actions as well as an association between data elements of an action according to a respective topology comprised of an ordered plurality of data categories including a subject data category, an object data category, a spatial data category and a temporal data category. By matching the identified data elements with action topology combinations and using the order of the data elements, one data element is matched with one data category. Instance information is supplemented to matched action topology combinations. In a computer readable format, at a data storage engine, identified data elements, instance information and associations between identifiers resulting from identifying, assigning, matching and supplementing are stored.

16 Claims, 6 Drawing Sheets

(56) References Cited

U.S. PATENT DOCUMENTS

| | | | |
|---|---|---|---|
| 2007/0179971 A1* | 8/2007 | Benson | G06F 16/283 |
| 2009/0063426 A1* | 3/2009 | Crouch | G06F 16/35 |
| 2011/0137919 A1* | 6/2011 | Ryu | G06F 16/9024 |
| | | | 707/748 |
| 2016/0155181 A1* | 6/2016 | Romaya | G06F 16/29 |
| | | | 705/26.63 |
| 2016/0217195 A1* | 7/2016 | Abrahams | H04L 67/306 |
| 2017/0011023 A1* | 1/2017 | Ghannam | G06F 16/90332 |

* cited by examiner

| Data ElementID | data element |
|---|---|
| ... | |
| 18 | car |
| 19 | house |
| 20 | coffee maker |
| 21 | carpenter |
| 22 | teacher |
| 23 | city |
| 24 | country |
| 25 | Birthplace |
| ... | |

Fig. 3

| ActionID | ActionName |
|---|---|
| ... | |
| 2 | MakeRecommendation |
| 3 | HasMeeting |
| 4 | DefineConstituent |
| 5 | PortOfEntry |
| 6 | TableImport |
| ... | |

Fig. 4

| DataCategoryID | DataCategory |
|---|---|
| 1 | Who |
| 2 | What |
| 3 | Where |
| 4 | When |

Fig. 5

| TopologyID | Topology |
| --- | --- |
| ... | |
| 4 | 4,2 (WhenWhat) |
| 5 | 1,2,3,4 (WhoWhatWhereWhen) |
| 6 | 4,3,1 (WhenWhereWho) |
| ... | |

Fig. 6

| ActionTopologyID | ActionID | TopologyID |
| --- | --- | --- |
| ... | | |
| 5 | 1 | 6 |
| 6 | 5 | 6 |
| 7 | 2 | 7 |
| 8 | 2 | 5 |
| ... | | |

Fig. 7

| Action Topology InstanceID | TimeStamp | StatusID | ActionTopologyID | Applying ActionIDs | Constraining ActionIDs | DataElementIDs |
| --- | --- | --- | --- | --- | --- | --- |
| ... | | | | | | |
| 18 | 2016-02-02T08:18:24.928326 | 1 | 3 | | | 59,24 |
| 19 | 2016-02-02T08:18:24.928410 | 1 | 5 | 0,9,2,3 | | 53,41,4 |
| 20 | 2016-02-02T08:1824.928493 | 1 | 6 | | 0,10,8,4 | 53,48,5 |

Fig. 8

DataElementID to ActionID matrix

ActionID to TopologyID matrix

DataElementID to DataCategoryID matrix

TopologyID to ActionTopologyInstanceID matrix

QUERY EXPRESSION

DATA = DATAELEMENT["PETE", "LILLY", "ANTWERP"]

ACTION =
    [0 1 1;    # OR
     1 0 0;    # AND
     0 0 0]    # NOT
     0 0 0     # DataCategoryID TOPOLOGY =
    [0 1 1;    # OR
     0 0 0;    # AND
     0 0 0]    # NOT
     0 0 0     # DataCategoryID ACTIONTOPOLOGYINSTANCE =
    [0 1 1;    # OR
     0 0 0;    # AND
     0 0 0]    # NOT
     0 0 0     # DataCategoryID

Fig. 13

COMPUTER IMPLEMENTED AND COMPUTER CONTROLLED METHOD, COMPUTER PROGRAM PRODUCT AND PLATFORM FOR ARRANGING DATA FOR PROCESSING AND STORAGE AT A DATA STORAGE ENGINE

CROSS REFERENCE TO RELATED APPLICATIONS

The present application claims priority to Dutch Patent Application No. 2016846, filed on May 27, 2016, the disclosure of which is incorporated herein by reference in its entirety.

TECHNICAL FIELD

The present disclosure relates to data processing and data storage, more particular, to computer implemented and computer controlled processing and storage of computer readable data in accordance with a data structuring format.

BACKGROUND

In its most general form, a database refers to a set of data elements and the data model by which these data elements are interrelated. In conventional databases, the meaning or value of each data element is determined by its position in the data model. A data element representing the given name of a person in the database gets its proper meaning because it is stored under or allocated to a label such as 'Given_Name' in a table called 'People', for example. It is for this reason that in conventional database systems the first step in the implementation and deployment of the database is to produce a conceptual data model that reflects the complete structure of the information to be held in the database.

In conventional databases, a data element cannot be stored if there is not provided a specific header or label to which the data element can be allocated. To state it differently, a data element can only be stored if a particular space to store the data element is addressed beforehand.

In a dynamic application environment, with large and larger data sets to be stored, creating such 'complete' data models is difficult, time consuming and requires frequent adaptations, as the number of items representing a new and not foreseen meaning of a data element readily expand over time. With the introduction of mobile telephony, for example, the need arose to expand the data model by the additional storage of a mobile telephone number next to a land line telephone number. Those skilled in the art will appreciate the difficulties that one encounters with the expansion of the items to be stored in a conventional data model, such as but not limited to data inconsistencies, ambivalent models, data multiplication, and so on, all potential harmful points of failure.

Having produced a conceptual data model, the next step is to translate this model into a form that actually implements the relevant items in the database. This process is often called the logical database design, and the output is a logical data model expressed in the form of a schema. Whereas the conceptual data model is (in theory at least) independent of the choice of database technology, the logical data model will be expressed in terms of a particular database technology.

At present, the most popular database model for general-purpose databases is the relational model, using a table-based format. The process of creating a logical database design using this model involves a methodical approach known as normalization. The goal of normalization is to ensure that each elementary 'Item' is only recorded in one place, so that insertions, updates, and deletions automatically maintain consistency.

Besides the relational model, and without aiming to be complete, other known types of database models are designated a hierarchical database model, a network model, an object model, a document model, an array model, and a semantic model, for example.

Data that resides in a fixed field within a record or file is also called structured data. That is, data contained in relational databases and spread sheets, for example. Information that cannot be readily classified and does not fit into a particular box or a traditional row-column database, is called unstructured data. Examples of unstructured data are photos, graphic images, presentations, emails, and word processing documents, for example. Unstructured data files often include text and multimedia content. Note that while these types of files may have an internal structure, they are still considered 'unstructured' because the data they contain does not fit neatly in a rigid data model structure.

Semi-structured data is a mix of structured and unstructured data. It is a type of structured data, but lacks the strict data model structure. With semi-structured data, tags or other types of markers are used to identify certain elements within the data, but the data does not follow a rigid structure. For example, word processing software now can include metadata showing the author's name and the date created, while the bulk of the document just being unstructured text.

While a particular database model may be optimal for storing one or another type of data, in practice, the known database modelling techniques all suffer to a greater or lesser extent the problems involved with the expansion in the amount and new types of data that is created over time in a dynamically evolving organization.

When querying a relational database, for example, that is when making a request to retrieve information stored in the database, no relations between data elements can be revealed other than defined by the data model structure. Further, many database systems require to make requests for information in the form of a stylized query that must be written in a special query language. This is the most complex method because it forces users to learn a specialized language.

SUMMARY

It is an object of the present disclosure to provide a versatile computer controlled method of and a data processing platform for arranging structured, unstructured or semi-structured computer readable data for storage thereof, which method and platform can cope with the increase of data produced, both in terms of amount and the content thereof.

It is another object of the present disclosure to provide a computer implemented and computer controlled method of and a data processing platform for the retrieval of data stored in accordance with this versatile data storage method.

In a first aspect there is provided a computer implemented and computer controlled method of arranging data for processing and storage thereof at a data storage engine, wherein a computer performing the steps of:
  receiving data in a computer readable format, the data
    comprising a sequence of data elements;

identifying data elements in the received data and allocating to each of the identified data elements a unique data element identifier representing a respective data element;

assigning, to the received data, an action from a plurality of actions represented by a respective unique action identifier and a unique action topology identifier specifying an association between data elements of an action according to a respective topology comprised of an ordered plurality of data categories including a subject data category, an object data category, a spatial data category and a temporal data category, the topology being represented by a unique topology identifier and each data category being represented by a respective data category identifier;

matching the identified data elements with the assigned action topology combination in accordance with the order of the action topology and the sequence of the data elements, such that one data element is matched with one data category of the topology;

supplementing instance information to matched action topology combinations and allocating an action topology instance identifier to the supplemented action topology combination, and storing, in a computer readable format, at the data storage engine the identified data elements, the instance information and associations between identifiers resulting from the steps of identifying, assigning, matching and supplementing.

Rather than having to predefine a complete schema, consisting of tables with rows and columns and links or documents with fields and values, the present disclosure operates in accordance with a data structuring format essentially comprised of actions, topologies, action topology combinations, data categories and instance information.

The disclosure allows users to process data in the way they use same in their everyday life, by operating on unique pieces of data, called data elements, that are of interest to the user. The disclosure is based on the insight that such data elements—be it structured, unstructured or semi-structured data elements—each may be categorized in one or more data categories of a limited number of data categories, at least comprising a subject data category, an object data category, a spatial data category and a temporal data category.

That is, the subject data category refers to data elements retrieved by a 'who'-type query. Data elements that typically relate to a property, i.e. referring to a capacity or quality and the like, are to be allocated to the object data category. Data elements of the object data category are typically retrieved by a 'what'-type query. The spatial data category comprises data elements referring to a geographical position, a place, a space or the like and are retrieved by a 'where'-type query. Data elements generally referring to time are to be categorized in the temporal data category, and are the result of a 'when'-type query applied at the data to be stored.

Data elements are linked at the action level. An action specifies an association between data elements and may be defined as an intentional, purposive, conscious and subjectively meaningful activity. Generally an action involves an intention and a goal. Registering clients of a company, registering complaints, registering the constituents of a product, organizing/attending a meeting, filling a table, acting in a profession, are just a few examples of actions.

Although data elements may exist in isolation, in a scenario of use, however, data elements are always combined or associated with other data elements. It is such an association of data elements in an action that conveys full semantics of each data element for a particular use, and such association is expressed by a topology. A topology is comprised of an ordered plurality of data categories. That is a specific sequence and number of who's, what's, where's and when's. The number of data categories involved is defined by the length of a topology. Each topology is unique in the order of appearance and the number of the data categories of a respective topology.

For example, 'throwing' is an action that may involve a person, i.e. a subject, that performs the throwing, i.e. a 'who', an object that is to be thrown, such as a ball for example, i.e. a 'what', a place where the ball is thrown, such as at sports field, i.e. a 'where', possibly a receiver of the ball, i.e. again a subject expressed by the data category 'who', and perhaps the day that the ball is thrown, i.e. a 'when'. The topology template for this specific action is then constituted by the data categories |who, what, where, who, when|. One will appreciate that when the receiver of the ball is not of interest, the action involves a different topology, namely |who, what, where, when|.

A topology as such is not specific for an action. Different actions may share a same topology. However, same actions involving different topologies are distinguished from each other as specific action topology combinations. One will appreciate that the number of actions is virtually unlimited and depends on the number of category substituents and the number and length of the topology templates.

Action topology combinations may need further description that may not be qualified as part of an action that can be distinguished by a specific topology, such as that the 'where' data category of a particular topology refers to a city or refers to geographical co-ordinates, such as Global Positioning System, GPS, data, or in that the 'when' data category refers to 'years' or 'seconds', for example. However, other descriptive information may be supplemented to an action topology combination, like a timestamp indicating the time of matching, for example. Action topology combinations supplemented by descriptive information are referred to as action topology instances.

The disclosure involves storage of the data elements of the received data in association with at least one data category and at least one action. This effectively allows for storage of each data element just once, although a respective data element may be involved with different actions. Thereby providing vast storage space savings, and effectively avoiding duplications and inconsistencies in the data elements stored.

To this end, the identified data elements are matched with the assigned action topology combination in accordance with the respective action topology and the sequence of the data elements, such that one data element is mapped to one data category of the topology.

In accordance with the present disclosure, actions are represented by a respective unique action identifier. Topologies are represented by a respective unique topology identifier. An action topology combination is represented by a unique action topology identifier, and action topology instances are represented by a unique action topology instance identifier. Each data category is represented by a respective data category identifier, i.e. a subject data category identifier, an object data category identifier, a spatial data category identifier, and a temporal data category identifier. Data elements are represented by a unique data element identifier.

Using the respective identifiers when invoking the matching of the data elements, the present disclosure creates associations between the data element identifiers, action identifiers, action topology identifiers, topology identifiers, data category identifiers and action topology instance identifiers. Links between data elements, that in classical databases have to be predefined and expressed by table links or object-inheritance, come to light in the disclosure by the fact that a same data element may take part in different actions. Once a data element becomes part of one ore more actions it becomes automatically linked with other stored data elements, independent from the origin of the data element. In fact, one does not need to have knowledge beforehand about any data element stored, to retrieve information from it.

It will be appreciated that data elements. i.e. their identifiers, may be directly matched with a particular data category, i.e. a data category identifier, in a pre-defined manner, for example in case of a single action. Such that the step of assigning is implicitly performed by such direct matching.

By storing, in a computer readable format, at a data storage engine the identified data elements in connection with their respective data element identifier, the instance information in connection a respective action topology instance identifier, and the associations between the identifiers resulting from the steps of identifying, assigning, matching and supplementing, the present disclosure allows to query data elements in the most flexible way, just from manipulating the respective identifiers independent of the respective data elements.

The disclosure fully separates the raw data, the descriptive or instance data, and the identifiers. This means that query resolution can be done data-less. Even more, this full separation adds a powerful protection or security to the data elements, because the data elements, the instance information and the linking identifiers may be spread among physically separated hardware, i.e. data storage engines, data query engines and other data analysis engines.

It is just with the results of a query or an analysis that the respective data elements have to be revealed and, at this level too, a data proprietor may decide which data elements may be revealed and which not. The present disclosure reduces manipulation of big data sets objectively to manipulations on anonymous identifiers, thereby providing optimal privacy.

Analysis on the identifiers as such may provide information on the nature and validity thereof and hence the data stored, even without having to reveal particular data elements, i.e. their value or meaning.

In an embodiment the step of storing comprises building, by the computer, in the storage engine, a plurality of binary n-dimensional arrays, in particular a plurality of two-dimensional arrays, each array having a unique name and indices formed by respective identifiers, wherein the identifiers are preferably represented by numerical identifiers, and wherein associations between identifiers are expressed by a binary value, such that presence of an association between identifiers of an array is expressed by a first binary value and absence of a relation between the identifiers of an array is expressed by a second binary value.

With a limited set of, for example, bit-matrices, all links between the available data elements can be represented. These matrices can be easily split in fixed-size sub matrices, that can be stored over a virtually unlimited number of servers making up the storage engine, without the need for complex map reduce mechanisms or the like. The fact that this limited set—less than about 30—matrices allows to represent all of the links in the data also means that the indices don't grow exponentially in size or complexity just because the data becomes more complex.

The overhead of each unique data element and of each descriptive information is minimal—fixed to the size of its identifier, ID, and the number of bits referring to the ID within the matrices. The bit-matrices can be stored and retrieved easily on disc or other storage medium in a space-optimised format.

To this end, in an embodiment, the binary values are assigned by the computer to obtain sparse arrays or matrices, that is matrices of which the number of zero's is largest, requiring less storage space. It will be appreciated that this eventually may involve inversion of the bits that represent a link between the indices of the array or matrix.

In an embodiment, the computer stores the data element identifiers and the corresponding data elements, as well as the action topology instance identifiers and the corresponding instance information in lists. These lists, like the bit-matrices or arrays expressing links between the identifiers, may be split in sub-lists for storage over a number of servers making up the storage engine. Thereby adding another layer of security to the data storage.

The instance information, comprising descriptive information, in particular descriptive information pertaining to at least one data category of an action topology combination, may be structured in accordance with the data structuring format of the present disclosure used for the data elements, that is comprised of actions, topologies, action topology combinations, data categories and instance information.

The instance information, in particular, may comprise a so-called constraining action and a so-called applying action. A constraining action comprises a requirement that has to be fulfilled in connection with a particular data element. For example, for such data element an instance or instance information has to be available or defined. An applying action refers to data creation or triggering of an event or the like in connection with a particular data element.

By structuring the instance information also allocating respective identifiers in the manner as disclosed above in connection with the data elements, it will be appreciated that also links between the instance information can be revealed, providing a further layer of analysis.

A data element in accordance with the present disclosure is a piece of data such as a word in a sentence, a coded part or sample of a picture or a sound, a sensor value, and so on. In general, representing information or content of a text, a picture, sound, etc. Data elements of the digital data to be stored may be identified by comparing same with data elements stored at a data elements repository. However, data elements may also be identified by the computer from information received from manual user input or remote input from other data sources. A simple example is data in which the data elements are gathered in a specific prescribed order through a user interface or menu, or comma separated, or otherwise. Data elements may also be retrieved by the computer from applying a data elements identifying algorithm in relation to the digital data to be stored. Such a data elements identifying algorithm is, for example, based on statistical data element counting, pattern recognition, correlation and concepts detection algorithms.

An action to be assigned may be pre-defined and available for the computer from an actions repository, for example. However, actions may also be assigned dynamically by user input to the computer, generated by an action identifying algorithm, and/or based on pattern recognition by neural networks, for example, without suffering the problems of expanding the classical data model to cope with new types of and links between data elements to be stored.

An action topology combination may be assigned, by the computer, by retrieving a pre-defined topology from pre-defined topologies stored at a topologies repository, for example, or by a topology received by the computer through user input, for example, or from a suitable topology identifying algorithm, and combining same with the already assigned action. Data representing a text, a sentence, a clause, a scene, an event or the like can be structured by one or a plurality of topologies.

Unique identifiers may be allocated by the computer in accordance with a suitable algorithm as generally known to a person skilled in the art.

In a second aspect there is provided a computer implemented and computer controlled data query method, wherein a data query is performed by a computer on identifiers stored at a data storage engine as elucidated in accordance with the first aspect of the present disclosure.

As disclosed above, data elements are linked at the action level, comprised by at least one instance of a respective topology, i.e. an action topology combination, and these links are expressed by the associations between the respective identifiers resulting from the steps of identifying, assigning, matching and supplementing in accordance with the first aspect of the present disclosure.

Accordingly, stored data elements, either alone or in combination, can be retrieved, in accordance with the present disclosure, by any performing a data retrieving query at identifier level.

Any data element can be queried and all the links between any data elements can be discovered by three query types:
  an in-action query, identifying co-existence of data elements in a same action, based on the data element identifiers, action topology identifiers, action identifiers and topology identifiers;
  a common-action query, identifying data elements having a common set of actions, based on the data element identifiers, action topology identifiers, and action identifiers, and
  a correlation query, verifying data elements that are shared by different action topologies, based on the data element identifiers, action topology identifiers, action identifiers, and topology identifiers.

In an embodiment operating on the array or matrix representations of the associations between identifiers, a query matrix is generated based on data element identifiers of data elements in a query and binary expression matrices expressing a logical relationship between the data element identifiers at action, topology and action topology instance level. The query is resolved by overlaying the query matrix with any of the n-dimensional arrays or matrices expressing an association between identifiers, wherein the data element identifiers of data elements in a query are retrieved from stored data elements and corresponding data element identifiers.

Applying bit-logic operations available to a computer in overlaying the query matrix and any of the n-dimensional arrays or matrices, any query or question of whatever complexity can be solved with almost identical speed.

In addition to querying or searching data elements for an analysing purposes, the data retrieving query may be set such to mask data elements from being retrieved for selective displaying and data transfer, such as required in connection with data security applications.

The data structuring according to the present disclosure not only allows for a versatile and powerful mining of digital data including structured, semi-structured and unstructured data, to reveal unseen structure and information, simply by selecting or defining a proper data retrieving query, but also for the execution of operations.

Operations to be performed using the data stored, may be executed by defining a proper execution topology, comprised of execution categories. An execution category specifies a particular type of execution to be performed and an execution topology specifies a number and the order in which respective execution categories have to be executed, to eventually provide a specified operation.

By assigning to each execution topology a respective unique execution topology identifier and by assigning to each execution category a unique execution category identifier, operations can be performed in like manner as explained above in connection with resolving a query, by overlaying an execution matrix comprised of execution topology identifiers and execution category identifiers with any of the n-dimensional arrays or matrices expressing an association between identifiers, wherein the data element identifiers of data elements involved in an operation are retrieved from stored data elements and corresponding data element identifiers.

The method in accordance with the present disclosure is universally applicable for storing many different types of data, such as but not limited to text data, linguistic data, image data, video data, sound data, control data, measurement data, olfactive data and tactile data. Due to the structuring format of the present disclosure, data elements of all such data types are stored and retrieved in a standardized manner, such that same allows for combinations of different types of data which is not possible at all with presently known, conventional databases and database structures.

In a third aspect, there is provided a data processing platform, configured for arranging data for processing and storage thereof at a data storage engine, the platform comprising at least one computer and a data storage engine operatively configured for performing the steps of:
  receiving data in a computer readable format, the data comprising a plurality of ordered data elements;
  identifying data elements in the received data and allocating to each of the identified data elements a unique data element identifier representing a respective data element;
  assigning, to the received data, an action from a plurality of actions represented by a respective unique action identifier and a unique action topology identifier specifying an association between data elements of an action according to a respective topology comprised of an ordered plurality of data categories including a subject data category, an object data category, a spatial data category and a temporal data category, the topology being represented by a unique topology identifier and each data category being represented by a respective data category identifier;
  matching the identified data elements with the assigned action topology combination in accordance with the action topology and the order of the data elements, such that one data element is matched to one data category of the topology;
  supplementing instance information to matched action topology combinations and allocating an action topology instance identifier to the supplemented action topology combination, and
  storing, in a computer readable format, at the data storage engine the identified data elements, the instance information and associations between identifiers resulting from the steps of identifying, assigning, matching and supplementing.

The computer implemented and computer controlled data processing platform, in an embodiment thereof, may comprise a plurality of communicatively interconnected data processing devices operating a plurality of a data processing layers, such as comprising a first data processing layer arranged for providing at least one communication interface for exchanging data with the data processing platform;

a second data processing layer arranged for implementing and controlling the data structuring format, and a third data processing layer arranged for providing access to a plurality of data storage devices, for storage and querying purposes.

The processing platform, i.e. the computer or data processing devices, in further embodiments thereof, is configured for performing the method in accordance with the first aspect of the present disclosure, disclosed above.

Those skilled in the art will appreciate that the data processing devices and data storage devices need not be positioned in a single data room or the like. The platform is structured to allow remote processing and storage of data, in particular web-based processing and interfacing.

In a fourth aspect there is provide a computer implemented and computer controlled data query processing platform, comprising at least one computer configured for performing a data query on identifiers stored at the storage engine in accordance with the first aspect of the present disclosure, disclosed above.

The present disclosure also provides, in a fifth aspect, a computer program product, comprising program code means stored on a computer readable medium, the code means being arranged to perform the method according to any of the first and second aspect of the present disclosure, when the program code is executed by a computer, in particular wherein the code means are arranged for being integrated in or added to a computer application for joint execution of the program code and the computer application by a computer.

A computer readable medium may comprise any of a transitory or non-transitory computer readable medium as known to those skilled in the art. Non-transitory computer readable media for the purpose of the present disclosure include but are not limited to any of optically, magnetically, solid state semiconductor or other media, such as designated Compact Discs, CDs, Digital Versatile Disks, DVDs, flash memory, memory sticks, Hard Disk Drives, HDDs, Solid State Drives, SDDs, etc.

The above-mentioned and other features and advantages of the present disclosure will be best understood from the following detailed description referring to the attached drawings. In the drawings, like reference numerals denote identical parts or parts performing an identical or comparable function or operation. The examples provided are for illustrative purposes only and may not be construed as limitative for the present disclosure, its use and the scope of protection conferred by the appending claims.

BRIEF DESCRIPTION OF THE DRAWINGS

FIGS. 3-8 show, in a schematic and illustrative manner, examples of items stored in the several stores of FIG. 2 with their respective IDs, in accordance with the present disclosure.

FIGS. 9-12 show some examples of two-dimensional matrices illustrating links between IDs of several items, in accordance with the present disclosure.

FIG. 13 shows an example of a matrix based query expression for use with the two-dimensional matrices shown in FIGS. 9-12 and the items disclosed in FIGS. 3-8, in accordance with the present disclosure.

DETAILED DESCRIPTION

Figure 1:
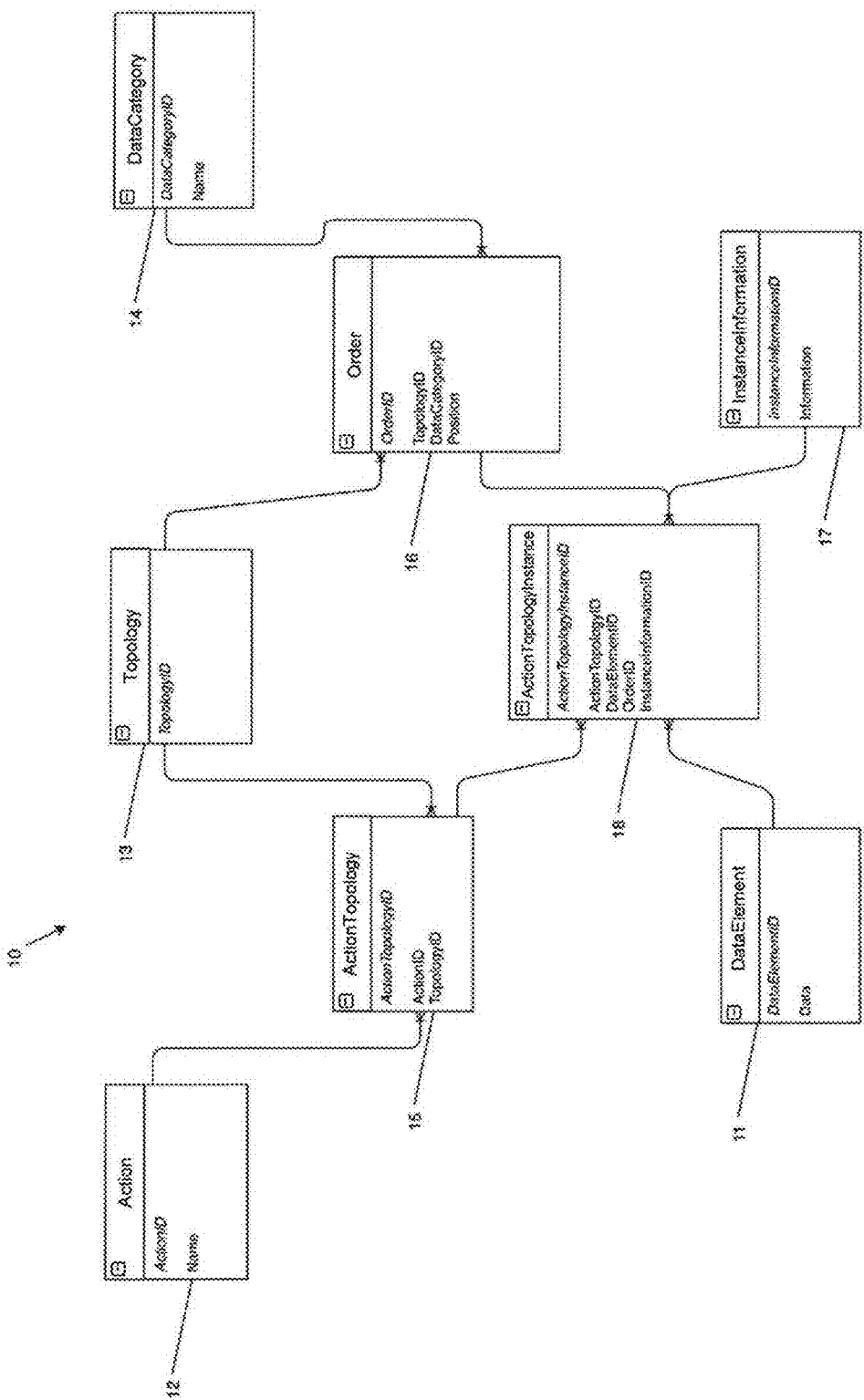
FIG. 1 shows, in a very schematic and illustrative manner, an entity relationship type diagram illustrating the relationships between the several entities of the data structuring format, in accordance with the present disclosure.

In the entity relationship type diagram 10 of FIG. 1, reference numeral 11 represents data elements received by a computer in a computer readable format. To each of the data elements a unique data element identifier, DataElementID, is allocated. Besides its ID, data elements may additionally be identified by a respective name, if applicable.

An action or actions to be assigned to the received data and the unique action identifier, ActionID, representing a particular action, are indicated by reference numeral 12. Actions may also have a particular name.

The entity designated by reference numeral 13 represents topologies. Topologies are comprised of a plurality of ordered data categories, and each topology is represented by a unique topology identifier, TopologyID.

Data categories, represented by entity 14, include a subject data category, an object data category, a spatial data category and a temporal data category. Each data category is represented by a respective data category identifier, DataCategoryID. Suitable names for the data categories are 'who', 'what', 'where' and 'when', respectively representing the subject data category, the object data category, the spatial data category and the temporal data category.

The action topology entity 15 specifies combinations of actions of the plurality of actions 12—an action represented by a respective unique ActionID—and a topology of the plurality of topologies 13—a topology represented by a respective unique TopologyID. Each such action topology combination is represented by a unique action topology combination identifier, ActionTopologyID, which may be comprised of a respective ActionID and TopologyID.

In order to match data elements 11 with an assigned action topology combination 15, the sequence of the data elements, i.e. their DataElementID, and the order of the data categories 14 in a particular topology 13 have to be observed. To this end, an order identifier entity 16, OrderID, is provided which represents the position of a particular data category identified by its DataCategoryID in a particular topology, represented by its TopologyID.

Based on this OrderID, instance information from an instance information entity 17 may be supplemented or added to the matched action elements and data categories in an action topology, which instance information is represented by a unique instance information identifier, InstanceInformationID.

The associations of the thus matched data elements, data categories and the instance information provided are expressed by a particular action topology instance of the action topology, having an action topology instance identifier, ActionTopologyInstanceID, as represented by entity 18.

That is, the action topology instance entity 18 represents the associations between DataElementIDs, InstanceInformationIDs, ActionTopologyIDs, TopologyIDs, DataCategoryIDs, and the respective order or position thereof by the OrderID. The associations between the respective IDs thus obtained may be stored in a plurality of arrays or matrices and may form a basis for data querying and for data execution, i.e. executing operations based on the data elements available.

Figure 2:
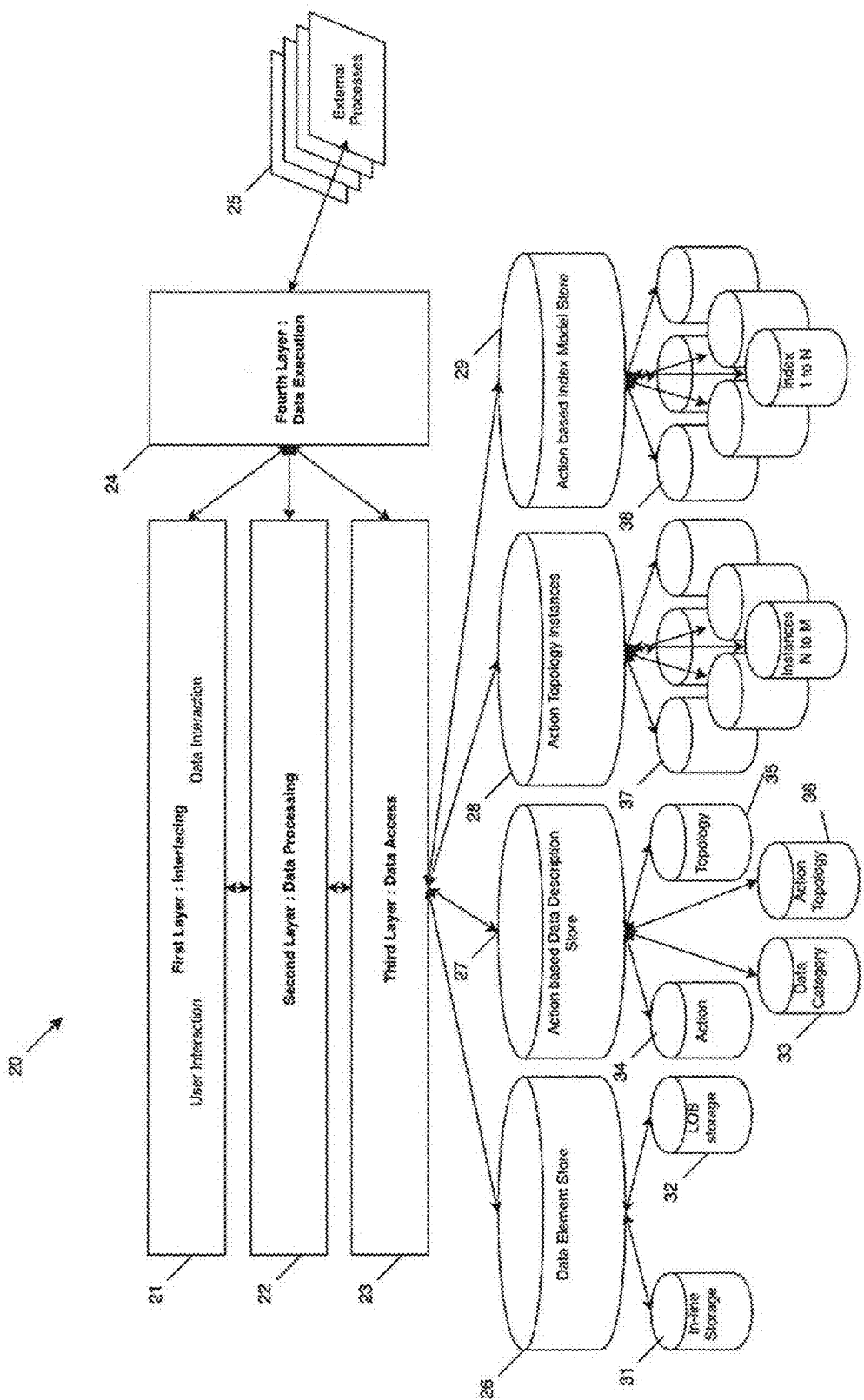
FIG. 2 shows, in a schematic and illustrative manner, in a block diagram representation, an example of a logical design of a data processing platform, in accordance with the present disclosure.

In the example of the processing platform 20 in accordance with the present disclosure as shown in FIG. 2, a computer comprising a first processing layer 21 is arranged to provide the communication interface(s) between the platform 20 and the external world. The first processing layer 21 ensures the exchange of data between the data processing platform and external sources and consumers of data (not shown). Typically, the data processing platform communicates with other computer based applications via automated exchanges of data or via user driven exchanges.

Once a request for data or a request to store data arrives with the platform 20 via one of the communication interfaces of the first processing layer 21 of the platform, a second or data processing layer 22 of the computer is configured for identifying data elements and assigning an appropriate action and topology to the data. Data elements may be identified through a suitable data elements identifying algorithm, from information provided through the user interface layer 21, or other sources of data and applicable information. Furthermore, by the data processing layer 22, the corresponding data categories are matched with the data elements based on their respective order.

To execute the process of assigning, ordering and matching on the data received or requested in a query, for example, the data processing layer 22 interacts with a third or data access layer 23 of the computer.

The data access layer 23 logically comprises at least four different logical data stores 26, 27, 28, 29. The first store 26, being the data element store, is configured for assigning a unique DataElementID to each stored data element and for storing each unique data element at least once (or with a user requested degree of redundancy) in the data element store 26.

Those skilled in the art will appreciate that the data element store 26 may as such also consist of different sub-stores. The most common reason for having different sub-stores will be the size and number of data elements to store. However one could also create a specific store for each different type of data elements to store. Examples of different data element types are string data, floating point numerical data, integer data, timestamp data, all of which can be stored in a common in-line store 31 or each have their own store. Larger data, like binary objects and many more, typically will be stored in a large object base, LOB, storage 32. One may also spread out the logical data element store over multiple geographically spread physical sub-stores or repositories or storage engines, to avoid potential latency and data losses that could occur if data has to travel over long physical distances or in case of a disaster occurring at one of the physical storage locations, such that data would no longer be available or becomes corrupted, for example.

The second logical store 27 is the action based data description store 27. This action based data description store contains all the elements needed to adequately describe the data elements and the relationships there between. These elements are data categories 33, each with a unique DataCategoryID, actions 34, each with a unique ActionID, topologies 35, each with a unique TopologyID and an ordered sequence of DataCategoryIDs, and action topology combinations 36, that also each have a unique ActionTopologyID. In accordance with what has been remarked about the data element store 26 above, also the action based data description store 27 may consist of different sub-stores in function of the size of the data it needs to store or based on other criteria relevant to the specific purpose of the application using the data processing platform 20.

Instead of retrieving actions and topologies from a store or repository 34, 35, respectively, same may be inputted by a user, for example, through the first or interfacing layer 21 of the data processing platform. Action identifying algorithms and topology identifying algorithms may be executed by the second or data processing layer 22 of the platform 20.

The third logical store, namely the action topology instance store 28, actually establishes the link between the information in the action based data description store 27 and the data elements in the data element store 26, by using the respective IDs. The link is established by means of action topology instances. An action topology instance persists the way in which an action was assigned to an ordered sequence of data elements by matching its corresponding topology information expressed in the unique action topology combination with the ordered sequence of identified data elements. Moreover, for each action topology instance specific instance information is persisted. This instance information can be things like a status, extra information about the different data elements that can be derived from and associated with their position in the topology and the corresponding data category and the specific combination of the action and the topology.

As for all stores the action topology instance store may consist of multiple different sub-stores 37 in function of the size of the data it needs to store other criteria relevant to the specific purpose of the application using the data processing platform 20.

The fourth logical store 29 of the data access layer 23 is the action model based index store. This store contains all indices needed to describe and persist all the links between all the items present in the other stores of the data access layer 23, making use of their respective identifiers.

A particularly advantageous way of representing and persisting these links in the context of the present disclosure is by using sparse bit matrices. This, because every particular kind of item in the data processing platform 20 may be represented by a specific set of numerical identifiers and since the number of sets is very limited. A sparse bit matrix can be defined and populated for all the pairs of specific identifier sets, expressing for each identifier in the first set whether it is linked or not to each identifier in the second set, by using 0 or 1 Boolean values, without generating significant overhead.

There are specific sets of identifiers for data elements, actions, data categories, topologies, action topology combinations, action topology instances and all necessary positional information may be expressed by using the length of the longest defined topology as an upper boundary.

The action model based index store 29, which also can comprise different sub-stores 38, creates the unique advantage of making it possible to express links between data elements at the moment they are introduced to the data processing platform instead of having to predefine them as is required in most state-of-the art data management systems.

Another unique advantage of the index store 29 is that it allows to query all the data present in the data processing platform without having to know where in the platform same are stored and without having to explicitly join different parts of the data description model as is common practice in state-of-the-art data processing platforms.

Moreover the combination of numerical identifiers, sparse bit matrices and the separation between data elements, descriptive elements and indices enables the data processing platform 20 to execute a number of operations such as data quality control, duplicate data detection, data similarity calculations et cetera, on the data in the system without disclosing or touching the data itself, and just using the knowledge encapsulated in the sets of identifiers and the links between the members of those sets expressed in the sparse bit matrices.

The fourth layer 24 in the figure is the data execution layer of the computer. This layer enables the data processing platform to automatically execute operations to be performed using the data stored and may executed a proper topology comprised of execution categories such as triggering a signal, loading an application, stopping in application, sending data to an external system and any alike as represented by external process 25.

FIG. 3 shows a sample set of data elements, represented by their respective DataElementID as stored in the data element store 26 of the platform 20 of FIG. 2. FIG. 4 shows a sample of actions, represented by their ActionIDs as stored in or retrieved from the action store 34 of FIG. 2. FIG. 5 describes the subject data category, object data category, spatial data category and temporal data category, i.e. represented by the names Who, What, Where and When, respectively, and identified by their unique DataCategoryID, stored in repository or data category store 33 of FIG. 2.

FIG. 6 is a list of examples of topologies and their unique TopologyID. As disclosed, a topology is an ordered list of DataCategoryIDs. In the figure, for clarity sake, the DataCategoryIDs are also represented by their respective names. See also FIG. 5.

The list in FIG. 6 shows examples of combinations of actions of the plurality of actions 12—an action represented by a respective unique ActionID—and a topology of the plurality of topologies 13—a topology represented by a respective unique TopologyID. Each such action topology combination is represented by a unique action topology combination identifier, ActionTopologyID.

An example of action topology instance information, for a particular ActionTopologyInstanceID, is shown in FIG. 8. The instance information in this example comprises a timestamp, i.e. TimeStamp, a status, i.e. StatusID, applying actions, i.e. ApplyingActionIDs and constraining actions, i.e. ConstrainingActionIDs. and is stored in the action topology instances store 28 in FIG. 2. In the list, a '0'-value in the respective ActionIDs represents absence of a respective action for the corresponding position in the applicable topology.

The examples above are, of course, not exhaustive and merely provided for illustration purposes, while the IDs are shown as numerical identifiers. One will appreciate that other types of identifiers may be used for the same purpose.

Links between the respective IDs, expressed in bit matrices in accordance with the present disclosure, are shown in the examples of FIGS. 9-12. These matrices shown are just a few of a plurality of matrices or multi-dimensional arrays that can be established based on the data structuring, processing and storage in accordance with the present disclosure. In the naming of the bit matrices, the item first mentioned represents the IDs of the rows and the last mentioned item represents the IDs of the columns. The matrices are stored in the action based index model store 29, as shown in FIG. 2.

Figures 9, 10, 11:
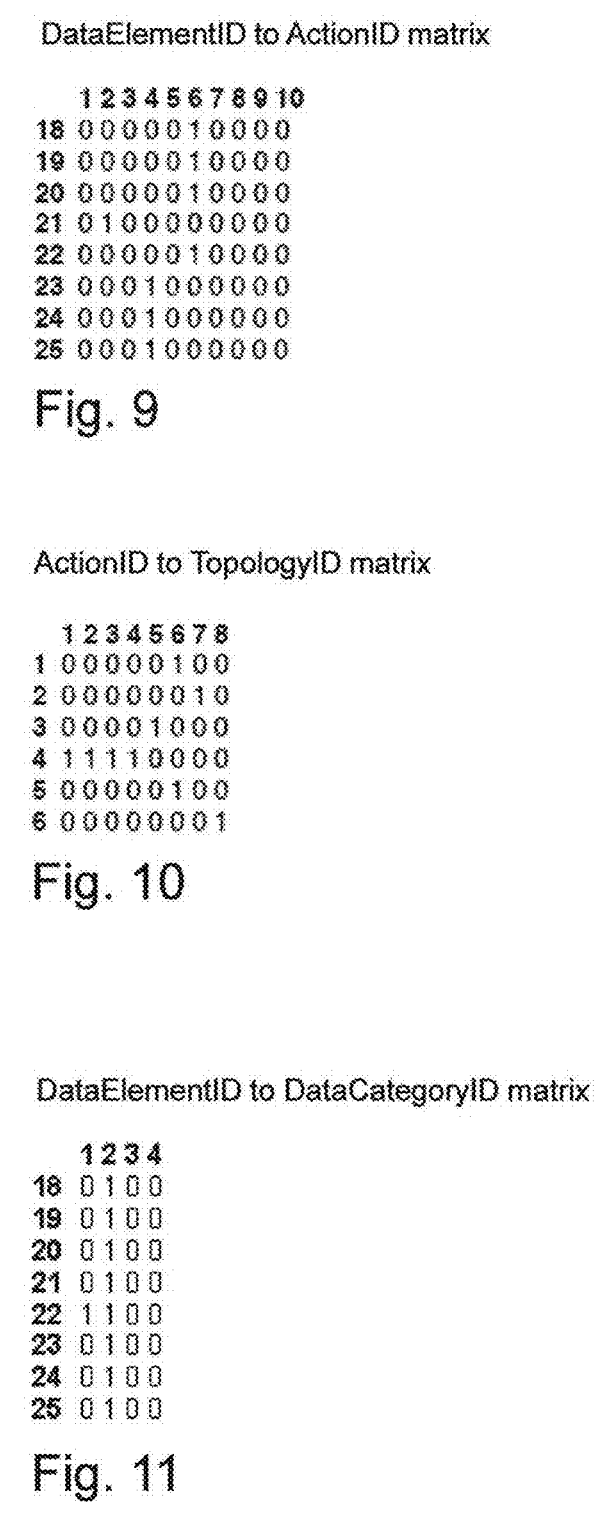

The DataElementID to ActionID matrix shown in FIG. 9, expresses associations of data elements, denoted by their respective DataElementID, listed and bold printed in the left most column of the matrix, and actions, denoted by their respective ActionID, listed and bold printed in the upper row of the matrix. In the matrix, a '1'-value indicates that a respective data element is involved in a respective action, and a '0'-value indicates that a respective data element is not involved in a respective action.

The ActionID to TopologyID matrix shown in FIG. 10, expresses combinations of actions, denoted by their respective ActionID, listed and bold printed in the left most column of the matrix, and topologies, denoted by their respective TopologyID, listed and bold printed in the upper row of the matrix. In the matrix, a '1'-value indicates the presence of a respective action and topology combination, and a '0'-value indicates absence of such combination. As can be seen from the matrix, a topology as such is not specific for an action. For example, the different actions 1 and 2 share the same topology 6. Action 4 involves different topologies 1, 2, 3, 4. Such action topology combinations are distinguished from each other by specific action topology combinations.

The DataElementID to DataCategoryID matrix shown in FIG. 11 indicates to what data category or data categories, denoted by their respective DataElementID, listed and bold printed in the top row of the matrix, a particular data element, represented by its DataElementID, listed and bold printed in the left most column of the matric, pertains to. Thus, for example, data element 18 is of the 'What' category, while data element 22 may be both a Who and a What. See also FIG. 5.

Figures 12, 13:
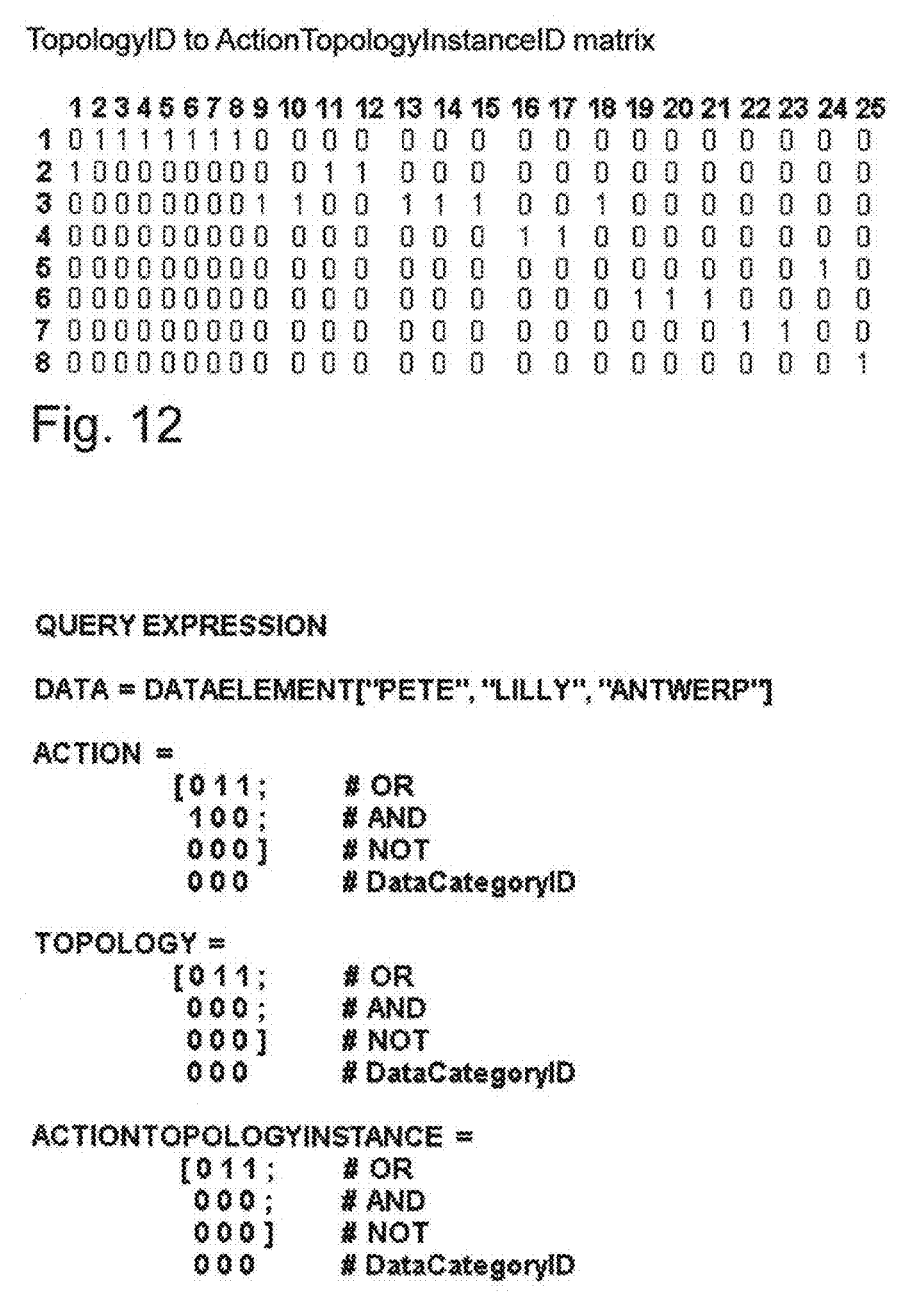

The TopologyID to ActionTopologyInstanceID matrix in FIG. 12, shows that multiple action instances may be associated with a respective topology. In the matrix of FIG. 12 topologies are denoted by their respective TopologyID, listed and bold printed in the left most column of the matrix, and action topology instances are denoted by their respective ActionTopologyInstanceID, listed and bold printed in the upper row of the matrix. Again, in the matrix, a '1'-value indicates an association and a '0'-value indicates absence of an association.

The matrix representation shows the flexibility of the disclosed disclosure, as the links in the context of the disclosed disclosure result in sparse bit matrices requiring less storage space. A sparse bit matrix or multi-dimensional array can be defined and populated for all the pairs of specific identifier sets, expressing for each identifier in the first set whether it is linked or not to each identifier in the second set, by using 0 or 1 Boolean values, without generating significant overhead.

A query can be expressed, as shown in FIG. 13, by enumerating the data elements one is looking for. The logical links the user wants to specify between the data elements in the query can be expressed by filling out a simple binary matrix for each of the levels in the descriptive-model (actions, topologies, action-topology-instances).

These binary expression matrices have as many rows as there are data elements in the query. The number of rows in binary expression matrixes is fixed. The first row expresses the logical OR-relationship, the second row expresses the logical AND-relationship and the third row expresses the logical-NOT. A binary one, i.e. a '1'-value, at the corresponding position in the described row means that the query-result needs to fulfill the logical relation between that data element in the query and the other elements for the corresponding querying level. An additional row is provided in which the DataCategoryID for each data element in the query that is of interest to the user may be specified. Zero values in this row mean that any data category associated with the specified data element will be considered a valid result.

One will appreciate that instead of mentioning the data elements themselves, such as "Pete", "Lilly", "Antwerp", for example, the query-description can also start from the respective DataElementIDs of the data elements, in those cases where they are known upfront or the data elements themselves may not be disclosed for security reasons or otherwise.

Queries are resolved easily. In a first step an easy look-up in the data element store 26 is performed to find the IDs of the data elements mentioned as query-data. The second step is to create a query matrix by using the IDs resulting from the first step and the logical model described in the binary expression matrices, to generate the query matrix that can be overlaid with the set of index matrixes describing the links between the data and all descriptive elements. In a third step the set of IDs resulting from the expanding and overlay operations is then used to fetch the actual data elements into the query result.

The present disclosure may be practiced otherwise than as specifically described herein, and the above-mentioned embodiments and examples are merely intended as an illustration to the skilled reader.

The invention claimed is:

1. A computer implemented and computer controlled method of arranging data for processing and storage thereof at a data storage engine, wherein a computer performing the steps of:
  receiving data in a computer readable format, said data comprising a plurality of ordered data elements;
  identifying data elements in said received data and allocating to each of said identified data elements a unique data element identifier representing a respective data element;
  assigning, to said received data, an action from a plurality of actions represented by a respective unique action identifier and a unique action topology identifier specifying an association between data elements of an action according to a respective topology comprised of an ordered plurality of data categories including a subject data category, an object data category, a spatial data category and a temporal data category, said topology being represented by a unique topology identifier and each data category being represented by a respective data category identifier;
  matching said identified data elements with said assigned action topology combination in accordance with said action topology and said order of said data elements, such that one data element is matched with one data category of said topology;
  supplementing instance information to matched action topology combinations and allocating an action topology instance identifier to said supplemented action topology combination, and
  storing, in a computer readable format, at said data storage engine said identified data elements, said instance information and associations between identifiers resulting from said steps of identifying, assigning, matching and supplementing.

2. The method according to claim 1, wherein said step of storing comprises building, by said computer, in said storage engine, a plurality of binary n-dimensional arrays, in particular a plurality of two-dimensional arrays, each array having a unique name and indices formed by respective identifiers, and wherein associations between identifiers are expressed by a binary value, such that presence of an association between identifiers of an array is expressed by a first binary value and absence of a relation between said identifiers of an array is expressed by a second binary value, and in particular wherein said binary values are assigned by said computer to obtain sparse arrays.

3. The method according to claim 1, wherein said step of storing comprises building, by said computer, at least one of a list of:
  data element identifiers and corresponding data elements;
  action topology instance identifiers and corresponding instance information.

4. The method according to claim 1, wherein said instance information comprises descriptive information, in particular descriptive information pertaining to at least one data category of an action topology combination, said instance information being structured in accordance with a data structuring format comprised of actions, topologies, action topology combinations, data categories and respective unique identifiers.

5. The method according to claim 1, wherein data elements of said data are identified by said computer using at least one of:
  data elements stored at a data elements repository;
  information related to receiving said data, and
  a data elements identifying algorithm.

6. The method according to claim 1, wherein an action is assigned by said computer using at least one of:
  pre-defined actions stored in an actions repository;
  an action received by said computer, and
  an action identifying algorithm.

7. The method according to claim 1, wherein an action topology combination is assigned by said computer by retrieving a topology from:
  pre-defined topologies stored at a topologies repository;
  topologies received by said computer, and
  a topology identifying algorithm.

8. The method according to claim 1, wherein a data query is performed by said computer on identifiers stored at said data storage engine.

9. The method according to claim 8, wherein said query comprises one of:
  an in-action query, identifying co-existence of data elements in a same action, based on said data element identifiers, action topology identifiers, action identifiers and topology identifiers;
  a common-action query, identifying data elements having a common set of actions, based on said data element identifiers, action topology identifiers, and action identifiers, and
  a correlation query, verifying data elements that are shared by different action topologies, based on said data element identifiers, action topology identifiers, action identifiers, and topology identifiers.

10. The method according to claim 8, wherein a query matrix is generated based on data element identifiers of data elements in a query and binary expression matrices expressing a logical relationship between said data element identifiers at action, topology and action topology instance level, and said query is resolved by overlaying said query matrix with any of said n-dimensional arrays expressing an association between identifiers, wherein said data element identifiers of data elements in a query are retrieved from stored data elements and corresponding data element identifiers.

11. The method according to claim 1, wherein execution operations are performed by said computer based on execution topologies, each represented by a unique execution topology identifier, and comprised of execution categories, each represented by a unique execution category identifier, and identifiers stored at said data storage engine.

12. A non-transitory computer readable medium, comprising program code arranged to perform the method according to claim 1, when said program code is executed by a computer.

13. A non-transitory computer readable medium, comprising program code, said program code arranged to be integrated in a computer application for joint execution of said computer application and said program code to perform the method according to claim 1, when said program code and said computer application is executed by a computer.

14. A computer implemented and computer controlled data processing platform, configured for arranging data for processing and storage thereof at a data storage engine, said platform comprising at least one computer and a data storage engine operatively configured for performing the steps of:
receiving data in a computer readable format, said data comprising a plurality of ordered data elements;
identifying data elements in said received data and allocating to each of said identified data elements a unique data element identifier representing a respective data element;
assigning, to said received data, an action from a plurality of actions represented by a respective unique action identifier and a unique action topology identifier specifying an association between data elements of an action according to a respective topology comprised of an ordered plurality of data categories including a subject data category, an object data category, a spatial data category and a temporal data category, said topology being represented by a unique topology identifier and each data category being represented by a respective data category identifier;
matching said identified data elements with said assigned action topology combination in accordance with said action topology and said order of said data elements, such that one data element is matched with to one data category of said topology;
supplementing instance information to matched action topology combinations and allocating an action topology instance identifier to said supplemented action topology combination, and
storing, in a computer readable format, at said data storage engine said identified data elements, said instance information and associations between identifiers resulting from said steps of identifying, assigning, matching and supplementing.

15. The computer implemented and computer controlled data processing platform according to claim 14, wherein said at least one computer is configured for performing a data query on identifiers stored at said storage engine.

16. The computer implemented and computer controlled data processing platform according to claim 14, wherein said at least one computer is configured for performing execution operations based on execution topologies each represented by a unique execution topology identifier, and comprised of execution categories each represented by a unique execution category identifier, and identifiers stored at said data storage engine.

* * * * *